(12) United States Patent
Kenigsberg et al.

(10) Patent No.: US 9,705,978 B1
(45) Date of Patent: Jul. 11, 2017

(54) DEPENDENCY GRAPH MANAGEMENT

(71) Applicant: Red Hat Israel, Ltd., Raanana (IL)

(72) Inventors: Dan Kenigsberg, Dublin (IE); Edward Haas, Petah Tikva (IL)

(73) Assignee: Red Hat Israel, LTD., Raanana (IL)

( * ) Notice: Subject to any disclaimer, the term of this patent is extended or adjusted under 35 U.S.C. 154(b) by 0 days.

(21) Appl. No.: 15/200,551

(22) Filed: Jul. 1, 2016

(51) Int. Cl.
*H04L 12/26* (2006.01)
*H04L 29/08* (2006.01)
*H04L 12/803* (2013.01)

(52) U.S. Cl.
CPC .......... *H04L 67/101* (2013.01); *H04L 43/045* (2013.01); *H04L 43/062* (2013.01); *H04L 47/125* (2013.01)

(58) Field of Classification Search
CPC . G06F 2009/45575; G06F 2009/45595; G06F 2009/45533; G06F 9/45558; G06F 9/5077; G06F 9/542; G06F 8/433; H04L 41/0806; H04L 41/5041; H04L 45/02; H04L 61/2007; H04L 67/101; H04L 43/045; H04L 43/062; H04L 47/125
USPC ...... 709/220, 224, 223; 718/1, 106; 717/156
See application file for complete search history.

(56) References Cited

U.S. PATENT DOCUMENTS

| | | | |
|---|---|---|---|
| 6,983,317 B1 * | 1/2006 | Bishop | H04L 43/0811 709/223 |
| 7,464,383 B1 | 12/2008 | Dow | |
| 7,711,987 B2 | 5/2010 | Agarwal et al. | |
| 7,831,637 B2 | 11/2010 | Sattler et al. | |
| 7,886,046 B1 * | 2/2011 | Zeitoun | H04L 41/145 370/230.1 |
| 8,495,598 B2 | 7/2013 | Gounares et al. | |
| 8,578,389 B1 | 11/2013 | Boucher | |
| 8,768,953 B2 | 7/2014 | Pan et al. | |
| 8,910,156 B1 * | 12/2014 | Kenchammana-Hosekote | G06F 9/45533 718/1 |
| 2004/0046785 A1 * | 3/2004 | Keller | G06F 9/5061 715/734 |
| 2006/0294499 A1 * | 12/2006 | Shim | G06F 9/44 717/107 |

(Continued)

OTHER PUBLICATIONS

Jurgen Graf, "Speeding up Context-, Object- and Field-Sensitive SDG Generation," Karlsruhe Institute of Technology (KIT), Karlsruhe, Germany.

(Continued)

*Primary Examiner* — Alina N Boutah
(74) *Attorney, Agent, or Firm* — Lowenstein Sandler LLP

(57) ABSTRACT

A mechanism for employing dependency graph in build projects is disclosed. A method of implementation of the disclosure includes receiving a request to change a first network entity attribute of a first network entity in a network system from a first value to a second value, the network system including the first network entity having the first network entity attribute and a second network entity having a second network entity attribute. The method can include retrieving a dependency graph of the network system, the dependency graph indicating a mapping of the first network entity and the second network entity and a dependency link between the first network entity attribute and the second network entity attribute. The method can include changing a first value of the first network entity attribute to a second value and change a third value of the second network entity attribute to the second value.

22 Claims, 13 Drawing Sheets

(56) References Cited

U.S. PATENT DOCUMENTS

| | | | |
|---|---|---|---|
| 2007/0226686 A1* | 9/2007 | Beardslee | G06F 8/451 717/109 |
| 2007/0294420 A1* | 12/2007 | Mohindra | G06F 8/60 709/230 |
| 2008/0201705 A1* | 8/2008 | Wookey | G06F 8/68 717/175 |
| 2008/0215796 A1* | 9/2008 | Lam | G06F 9/44505 711/100 |
| 2008/0281838 A1 | 11/2008 | Nichols | |
| 2011/0035747 A1* | 2/2011 | Machida | G06F 8/63 718/100 |
| 2012/0005236 A1* | 1/2012 | Deng | G06F 8/10 707/798 |
| 2012/0278365 A1* | 11/2012 | Labat | G06Q 10/06 707/798 |
| 2012/0324442 A1* | 12/2012 | Barde | H04L 49/70 718/1 |
| 2013/0308444 A1* | 11/2013 | Sem-Jacobsen | H04L 47/125 370/230 |
| 2014/0109106 A1* | 4/2014 | Fanning | G06F 8/433 718/106 |
| 2014/0282361 A1* | 9/2014 | Beardslee | G06Q 30/018 717/104 |
| 2014/0317385 A1* | 10/2014 | Vanderspek | G06F 8/433 712/216 |
| 2015/0268992 A1* | 9/2015 | Fan | G06F 9/4843 718/106 |
| 2016/0094477 A1* | 3/2016 | Bai | G06F 9/00 709/226 |

OTHER PUBLICATIONS

Intel® TBB 4.4, "Parallelizing Data Flow and Dependency Graphs," Intel® Threading Building Blocks (Intel®TBB) Developer Guide.

* cited by examiner

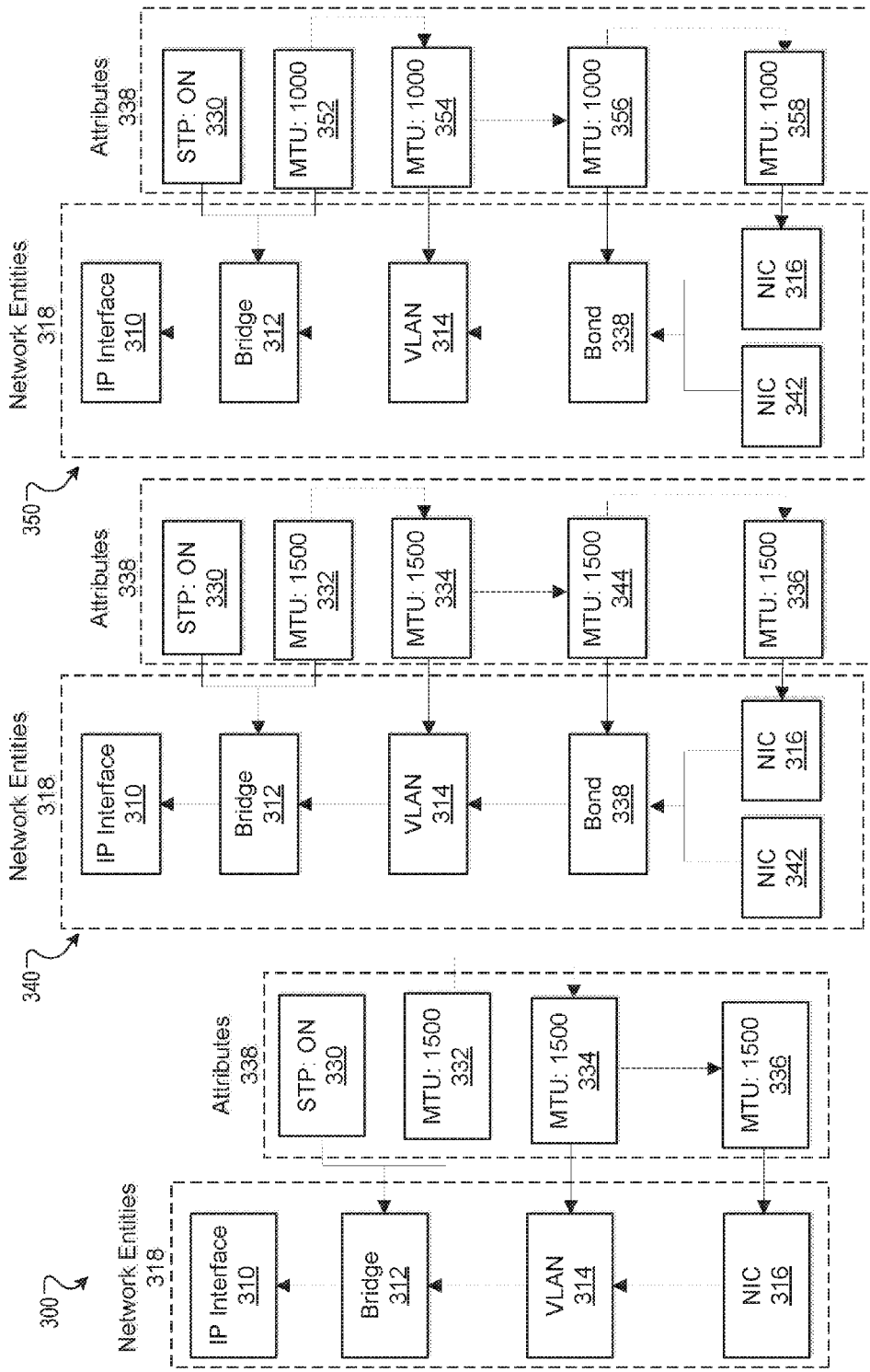

DEPENDENCY GRAPH MANAGEMENT

TECHNICAL FIELD

The implementations of the disclosure generally relate to employing a dependency graph in a network system.

BACKGROUND

A network system is a system of workstations, computers, electronic devices, and terminals connected over a network, such as a local area network (LAN) or a private network. The network system can enable file sharing, database sharing, application sharing, and resource and hardware sharing over a network. The network system can include multiple components and services. Additionally, the network system can increase a data throughput between the devices in the network by load balancing workloads of the devices. The network system can increase a number of the resources available to the devices within the network system by sharing the different components of the devices available within the network.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

FIG. 3B illustrates the OTF dependency graph of FIG. 3A with network entities having maximum transmission units (MTUs) attributes according to one example.

FIG. 3C illustrates adding a NIC bond and a NIC to the OTF dependency graph of FIG. 3B to generate OTF dependency graph according to one example.

FIG. 3D illustrates changing an MTU attribute of the bridge interface in the OTF dependency graph of FIG. 3C according to one example.

DETAILED DESCRIPTION

Figure 1:
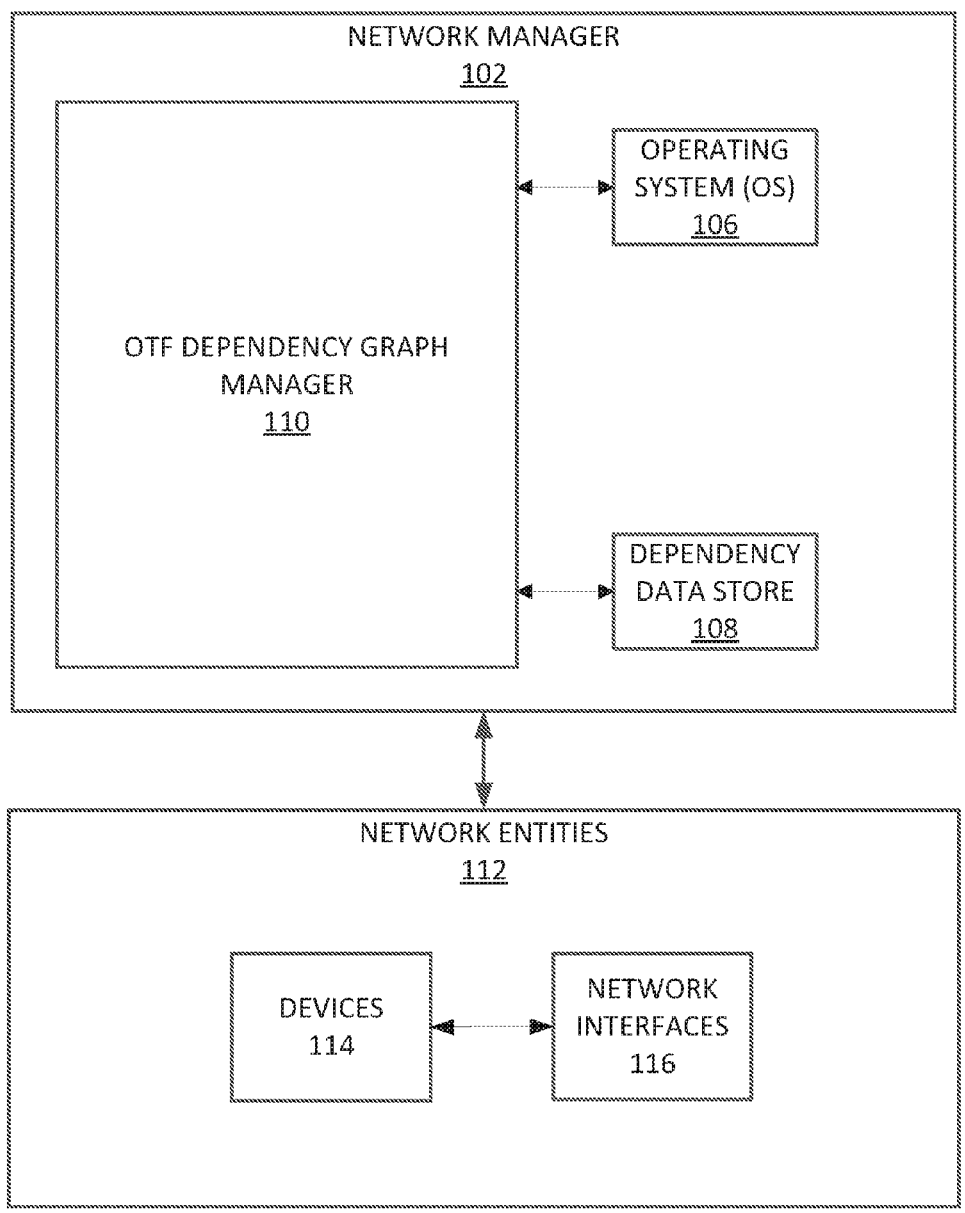
FIG. 1 is a block diagram illustrating a network system with an on the fly (OTF) dependency graph manager to generate and maintain an OTF dependency graph according to one example.

A network system can include multiple network entities to connect network components, such as workstations, computers, electronic devices, and terminals, over a network. A network entity can be hardware and/or a logical interface that connects multiple network components together in a network system. The network entities can include network interfaces. The network interfaces can include internet protocol (IP) interfaces, bridge interfaces, virtual local area network (VLAN) interfaces, network interface cards (NICs) bonds, NICs, and so forth.

Conventionally, network entities are dependent on other network entities within the network system. The network entity dependency can be defined as a first network entity in a network system that invokes a second network entity in the network system to perform a requested function. For example, a network interface card (NIC) may depend from a NIC bond and the NIC bond may depend from a VLAN interface in the network system. The VLAN interface can invoke the NIC bond to perform a first function that generates a result that is an input for a function performed by the VLAN interface. The VLAN interface depends on the result from the NIC bond in order to perform a second function at the VLAN interface.

In conventional network systems, it can be difficult for a network entities managing application (a network manager) to determine which network entities depend on other network entities in a network system with a complex network architecture.

Additionally, when the network manager does determine the dependency between network entities in the network system, the network manager may not have a mechanism to determine a number of network entity attribute dependencies between the network entities. For example, a network entity may have network entity attributes associated with the network entity. In one example, one or more of the network entity attributes may be independent of network entity attributes of the other network entities in the network. In another example, one or more of the network entity attributes may be dependent on network entity attributes of the other network entities. The network entity attributes can include an attribute for a spanning tree protocol (STP), an attribute for a maximum transmission unit (MTU), an attribute indicating a speed of a network entity, a duplex attribute indicating when a network entity is in a duplex mode, and so forth.

The network manager can receive a request to change a network entity or network entity attribute. Conventionally, each time the network manager receives a request, the network manager may tear down a current network architecture of the network system and generate a new network architecture because the network manager may not know the network entity dependencies and network entity attribute dependencies of the network entities in the current network system. The generation of the new network architecture each time the network manager receives a request to change a network entity or network entity attribute can be inefficient and can slow down the network system.

Aspects of the present disclosure address the above and other deficiencies by utilizing an on the fly (OTF) dependency graph to modify network entities in a network system. The network manager can use the network system logic and a configuration of the network entities when the network system was generated to create an OTF dependency graph. The OTF dependency graph can indicate a mapping of the dependencies between network entities in the network system. The OTF dependency graph can also indicate a mapping of the dependencies between network entity attributes in the network system The network manager can use the OTF dependency graph when adding, removing, or changing network entities or network entity attributes in the network system. For example, the OTF dependency graph can include a mapping of a dependency between a first network entity and a second network entity in the network system. The network manager can receive a request to remove the first network entity from the network system. The network manager can use the OTF dependency graph to remove the first network entity and update the dependencies of the remaining network entities in the network system. Accordingly, aspects of the present disclosure completely automate the operations for adding, removing, and changing network entities and/or network entity attributes in the network system, and significantly reduce computing resources needed to perform the above operations.

FIG. 1 is a block diagram illustrating a network system 100 with an OTF dependency graph manager 110 to generate and maintain an OTF dependency graph according to one example. The network system 100 can include a network manager 102 and one or more network entities 112. The network manager 102 can be a system on a chip (SoC), a processing device, a hardware component (e.g., circuitry, dedicated logic, programmable logic, microcode, etc.), computer program component (e.g., instructions executed by a processing device), or a combination thereof. The network manager 102 can be designed to support an operating system (OS) 106 and applications running in the network system 100.

The network system 100 can include network entities 112. The network entities 112 can include devices 114 and/or network interfaces 116. In one example, the device 114 is a circuit board or card that is coupled to a computer to connect the computer to a communication network. The device 114 can be a wireless local area network (WLAN) card or a network interface card (NIC) with integrated processing logic. In another example, the network interfaces 116 can include internet protocol (IP) interfaces, bridge interfaces, virtual local area network (VLAN) interfaces, or NIC bond. In one example, the VLAN interface can be a broadcast domain that is partitioned and isolated in the network system at the data link layer. In another example, the NIC bond can be a bond that combines multiple NICs into a single logical interface.

The network interfaces 116 can devices 114 connect a system of workstations, computers, electronic devices, and terminals over the network system 100. The device 114 can be hardware that is integrated into the workstations, computers, electronic devices, or terminals over the network system 100. The network interfaces 116 can be components executing on a device of the network manager 102.

The network manager 102 can include an OTF dependency graph manager 110 coupled to a dependency data store (e.g., a database, a table, a file, etc.) 108. The dependency data store 108 can store dependency information or architectural information for the network entities 112. For example, when the network manager 102 initially generates an architecture of the network system 100, the network manager 102 links various network entities 112 together using a predefined network system template to form the architecture, as discussed in greater detail below. The network manager 102 can initially generate an architecture for the network system 100 that meets specifications for the network system 100. For example, an application may send the specifications for the network system 100 to the network manager 102. The specifications can define a bandwidth and transmission unit capacity of the network system 100. The network manager 102 can use the predefined network system template to generate the architecture for the network system 100 that meets the specifications.

As the network manager 102 generates the architecture for the network system 100, the network manager 102 can store information defining the architecture of the network system 100 in the dependency data store 108. In one example, the architectural information can indicate the links between the network entities in the architecture of the network system 100. In another example, the architectural information can include network entity attribute information of the network entities 112. The OTF dependency graph manager 110 can use the architectural information to generate an OTF dependency graph, as discussed in greater detail below.

Additionally, when the network manager 102 adds, removes, or changes the network entities 112 in the architectural of the network system 100, the OTF dependency graph manager 110 can update the OTF dependency graph accordingly. The OTF dependency graph is referred as an on-the-fly graph because it is updated by the network manager 102 to reflect changes to the configuration and/or architecture of the network system 100 on the fly (i.e., without requiring system downtime, outage, and so forth). For example, the network manager 102 can receive a request to remove a first network entity in the network system 100 and replace it with a second network entity. When the network manager 102 replaces the first network entity with the second network entity, the network manager 102 can link the second network entity to the same network entities that the first network entity was linked to. As soon as (or while) the replacement is performed, the OTF dependency graph manager 110 can update the OTF dependency graph with the links between the second network entity and the other network entities, as discussed in greater detail below.

Each network entity of the network entities 112 can have network entity attributes associated with it. The network entity attributes can include an attribute for a STP of a network entity, an attribute for a maximum transmission unit (MTU) of a network entity, an attribute for a speed of a network entity, a duplex mode indicator for a network entity, and so forth. In one example, the network entity attributes are specific to a type of network entity. For example, a duplex mode indicator may be specific to a NIC while the STP attribute may be specific to a bridge interface. In another example, the network entity attributes are independent of the network entity attributes of the other network entities in the network system 100. For example, the STP attribute can specify if a spanning tree protocol is enabled (i.e., "on") or disabled (i.e., "off") for a first network entity in the network system 100. Whether the spanning tree protocol is enabled or disabled for the first network entity does not affect whether the spanning tree protocol is enabled or disabled for a second network entity in the network system 100. The spanning tree protocol for each network entity is independent of the spanning tree protocol for other network entities.

In another example, the network entity attributes for one or more of the network entities are dependent on the network entity attributes of the other network entities in the network system 100. For example, the MTU attribute can specify a largest packet size or frame size that can be sent in the network system 100. The largest packet size or frame size of a first network entity in the network system 100 can affect the largest packet size or frame size that can be sent in the network system 100. For example, the MTU of a communications protocol of a layer is the size (in bytes or octets) of the largest protocol data unit that the layer can pass onwards. MTU attributes may be associated with a communications interface (a NIC, a serial port, etc.). In one example, the frame size or packet size for the MTU attribute of a network entity may be predetermined for the network entity regardless of an architecture of the network system. In another example, the frame size or packet size for the MTU attribute of the network entity may be determined by the network manager in view of the architecture of the network system.

The network manager 102 can receive a request from a requesting entity to change the MTU attribute for the first network entity. In one example, the requesting entity can be a network management system (NMS). For example, the NMS can send a request to the network manager 102 to change an MTU attribute of the first network entity from a first frame size or packet size to a second frame size or packet size.

In another example, the requesting entity can be a controller or agent that is managing a specific network system 100 in a multiple network systems (Minos) architecture. A higher level management system can control the controller or the agent. For example, the NMS can be coupled to a first unit controller controlling a first network system and a second unit controller controlling a second network system. The NMS can then send a request to the first unit controller to change MTU value for a network entity 112 in the first network system. The first unit controller can then relay the request to the network manager 102 in the first network system. The network manager 102 can change the MTU value at the specified network entity 112 per the request.

Whether the NMS is coupled to a controller or directly to the network manager 102 can depend on a complexity of the network system 100. For example, when the network system has multiple network layers, each network layer can have its own abstraction. In this example, the network system 100 can have controllers to translate requests or relay request to the network managers 102.

In response to the network manager 102 receiving a request to change the MTU attribute for a network entity 112 designated in the request, the network manager 102 can change MTU attributes of other network entities with MTU attribute that depend from the network entity 112. When the network manager 102 changes a network entity attribute of the designated network entity 112 that a network entity attribute of one or more other network entities is dependent on, the OTF dependency graph manager 110 can update the OTF dependency graph to include the updated network entity attributes.

The network manager 102 can use the OTF dependency graph to make localized architectural changes to the network system 100, as discussed in greater detail below. An advantage of the network manager 102 making localized architectural changes can be to enable OTF changes to specific network entities 112 in the network system 100 while avoiding having to tear down the entire architecture of the network system and replacing it with a new architecture. Another advantage of the network manager 102 making localized architectural changes can be for an architectural change where there are no dependencies between the network entities 112 or the network entity attributes in the network system 100. When the OTF dependency graph indicates that there are no dependencies, the network manager 102 can add, remove, or change the network entities 112 or the network entity attributes without having to change any other network entities or other network entity attributes in the network system 100, as opposed to a conventional network system which typically needs to tear down a current network architecture and generate a new network architecture even when there are no dependencies because the conventional network system usually does not have a convenient mechanism for determining the lack of dependencies.

Figure 2:
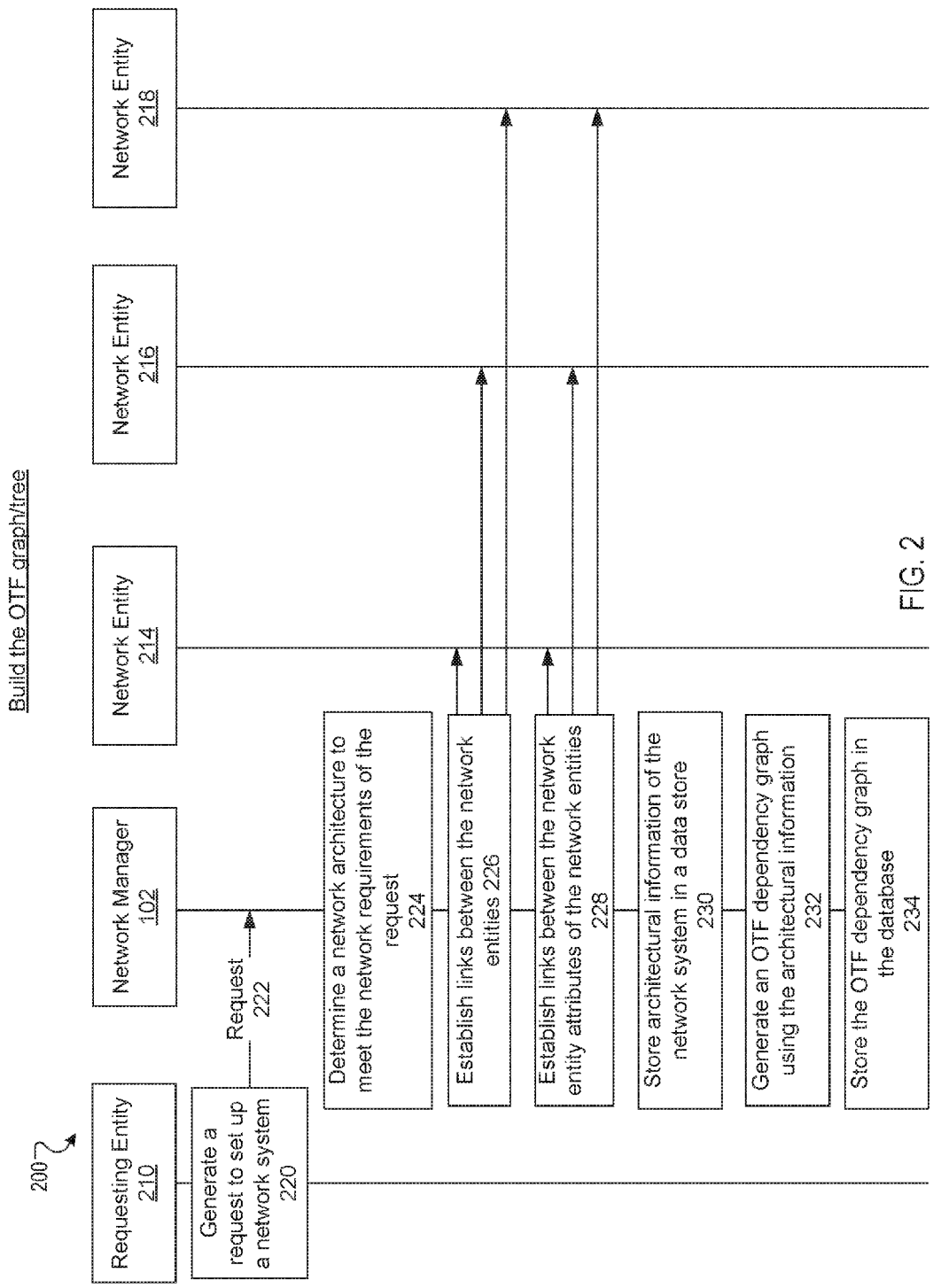
FIG. 2 illustrates a method for generating an OTF dependency graph according to one example.

FIG. 2 illustrates a method for generating an OTF dependency graph according to one example. The method 200 may at least partially be performed by processing logic that includes hardware (e.g., circuitry, dedicated logic, programmable logic, microcode, etc.), computer program components (e.g., instructions executed by a processing device), or a combination thereof. The method 200 may be performed by all or part of the network system 100 of FIG. 1. For example, the method 200 may be performed by all or part of the network manager 102 or the network entities 112. Some of the features in FIG. 2 are the same or similar to the some of the features in FIG. 1 as noted by same reference numbers, unless expressly described otherwise.

Referring to FIG. 2, the method 200 begins with a requesting entity 210 generating a request to set up the network system 100 (220). The request can include network system parameters, including: bandwidth parameters, throughput parameters, processing parameters, and so forth. The method can include the requesting entity 210 sending the request to the network manager 102 (222). The method can include the network manager 102 determining a network architecture to meet the network parameters of the request (224). The request can include network parameters such as a bandwidth of the network system 100, a MTU of the network system 100 the network, and so forth. The network manager 102 can translate the request using a predefined network system template to determine a number and type of network entities to meet the network parameters. The predefined network system template can define a layout of network entities to meet the network parameters. For example, the network manager 102 can use the predefined network system template to determine that to meet the network parameters, the network system 100 needs to include an IP interface, a bridge interface, a VLAN interface, a NIC bond, and a NIC in a predefined layout.

The method can include the network manager 102 establishing links between the network entities and the network entity attributes to form the network system 100 (226). In one example, the links between the network entities and the network entity attributes that form the network system 100 can be based on the types of network entities in the network system 100. The network manager 102 may use a predefined network system template when establishing the links between the network entities. The network system template can designate an order of network entities in an architecture of a network system. The order can define different levels of the network entities that indicate which network entities can depend from each other. For example, the network system template can define that the IP interface can be at a first level (such as a top level) of the predefined network system architecture, the bridge interface can be at a second level, the VLAN interface can be at a third level, the NIC bond can be at a fourth level, the NIC bond can be at a fifth level, and the NIC can be at a sixth level. The number of a level can indicate whether a network entity can depend from another network entity. For example, a network entity at a lower level may depend from a network entity at a higher level. However, a network entity at a higher level may not depend from a network entity at a lower level In another example, the network manager 102 may use the predefined network system template to establish the links between the network entity attributes of the network entities. In one example, with respect to MTU attributes, the template can specify that: a MTU attribute of a NIC is dependent on a MTU attribute of a NIC bond; a MTU attribute of the NIC bond is dependent on a MTU attribute of a VLAN; and a MTU attribute of the VLAN is dependent on a MTU attribute of a bridge interface. When the MTU attribute of the bridge interface is changed, the MTU attribute of the VLAN is also changed. When the MTU attribute of the VLAN is changed, the MTU attribute of the NIC bond is also changed. When the MTU attribute of the NIC bond is changed, the MTU attribute of the NIC is also changed. In another example, with respect to STP attributes, the network system template can specify that STP attributes are independent of each other.

The network manager 102 can determine the available network entities in the network system 100. In view of the available network entities in the network system 100, the network manager 102 can use the predefined network system template to generate a network system to meet the parameters of the request.

The method can include the network manager 102 establishing links between the network entities 214-218 to form the network system 100 (226). The method can also include the network manager 102 establishing links between the network entity attributes of the network entities 214-218 to form the network system 100 (228). The method can include the network manager 102 storing architectural information of the network system 100 in a data store (230). The method can include the network manager 102 generating an OTF dependency graph using the architectural information (232). The network manager 102 can generate and/or update the OTF dependency graph while the network system 100 is using the network entities 214-218, i.e. using with network entities 214-218 while updating the dependency graph on the fly. The network manager 102 can make localized changes to the OTF dependency graph while the network entities 214-218 are in use in the network system. The method can include the network manager 102 storing the OTF dependency graph in the data store (234).

Figure 3A:
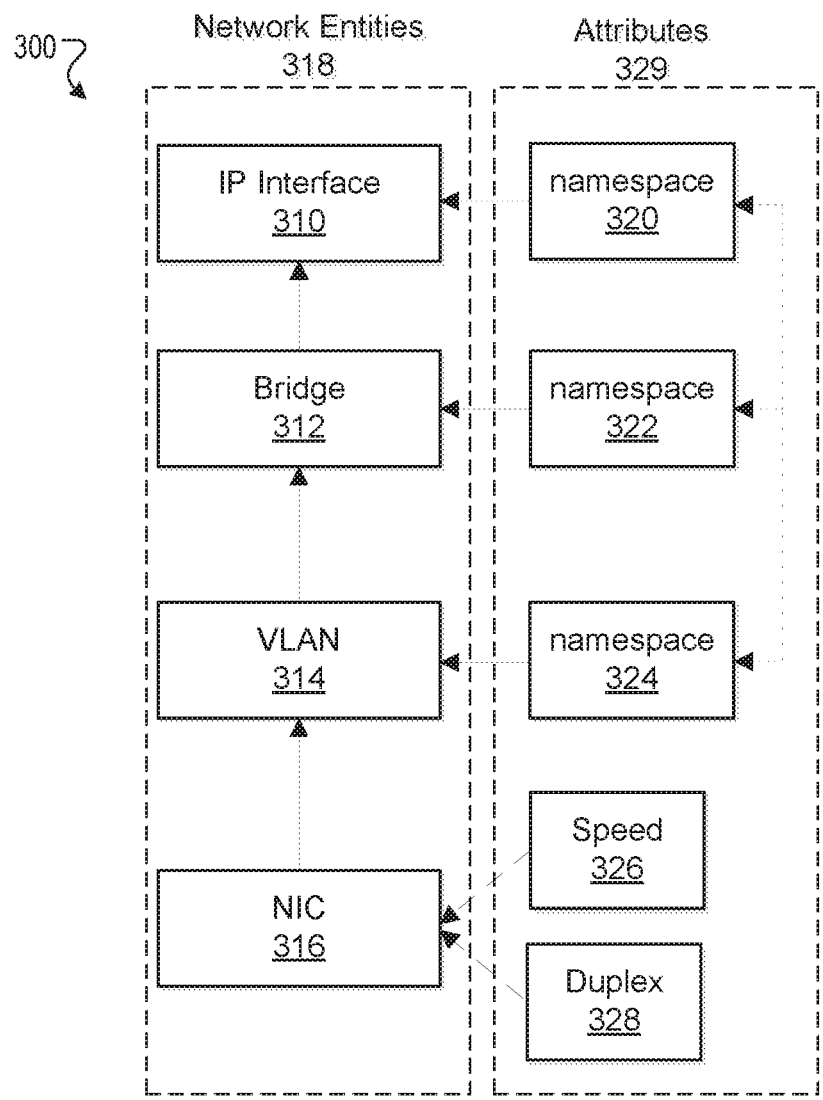
FIG. 3A illustrates an OTF dependency graph according to one example.

FIG. 3A illustrates an OTF dependency graph 300 according to one example. The OTF dependency graph 300 can include an IP interface 310, a bridge interface 312, a VLAN interface 314, and a NIC 316. The OTF dependency graph 300 can include a base node, dependent nodes, and attribute nodes. The base node can be a node in the OTF dependency graph that is at a top of the graphs and represent a base network entity from which other network entities depend (directly or indirectly). In one example, the base node can represent the IP interface 310 in the network system 100. The dependent nodes represent network entities that depend from the base network entity. In one example, the dependent nodes represent the bridge interface 312, the VLAN interface 314, and the NIC interface 316 in the network system 100. The attribute nodes represent the network entity attributes for the respective network entities in the network system 100. In one example, the attribute nodes can represent the namespace attributes 320-324, the speed attribute 326, and the duplex attribute 328 associated with the network entities 318.

The base node, the dependent nodes, and the attribute nodes of the OTF dependency graph 300 may be connected to each other by links representing the relationship between and among the nodes. The types of links can include channel links, dependency links, interdependency links, and network entity attribute links.

The links may be graphically represented as lines or arrows, as illustrated in FIGS. 3A-3D. In one example, the base node and the dependent nodes can be connected together by solid lines with arrows (referred to herein as channel links) that represent a dependency chain between the network entities 318. The channel links can represent data communication channels between the network entities 318 to communicate data. In one example, a first network entity may be dependent on a second network entity, when the first network entity should transfer data via the second network entity. For example, when the NIC 316 transfers data to the IP interface 310, the NIC 316 transfers the data via the VLAN interface 314 (causing it to be dependent on the VLAN interface 314). In another example, when the VLAN interface 314 transfers data to the IP interface 310, the VLAN interface 314 transfers the data via the bridge interface 312 (causing it to be dependent on the bridge interface 312).

The direction of the arrows in the OTF dependency graph 300 can indicate a dependency between the network entities 318. For example, the arrows indicate that the NIC 316 is dependent on the VLAN interface 314, the VLAN interface is dependent on the bridge interface 312, and the bridge interface 312 is dependent on the IP interface 310. The lines with arrows between the network entity attributes 329 and the network entities 318 are network entity attribute links. The network entity attribute links can indicate which network entity attributes 329 are associated with which the network entities 318. The dashed lines and arrows indicate dependency links or interdependency links. The dependency links indicate a relational direction of dependency between the entity attributes 329, where the arrows of the dependency links indicate the direction of the dependencies between the network entity attributes 329. The directions of the arrows of the dependency links show that the network entity attributes stemming from a base network entity attribute are contingent on the base network entity attribute. For example, in FIG. 3B (as discussed below) the arrows indicate that the MTU attribute 336 depends from MTU attribute 334 and the MTU attribute 334 depends from MTU attribute 332. When the MTU attribute 332 is changed, the MTU attributes 334 and 336 are also changed. The interdependency links indicate an interdependency between the network entity attributes 329. The arrows of the interdependency links indicate that the namespace attributes 320-324 are all interdependent. When one of the namespace attributes 320-324 is updated, all of the namespace attributes 320-324 are updated.

The network manager 102 (FIG. 1) can assign a namespace attribute 320 to the IP interface 310, the namespace attribute 322 to the bridge interface 312, the namespace attribute 324 to the VLAN interface 314, the speed attribute 326 and the duplex attributed 328 to the NIC 316. The namespace attributes 320-324 are sets of symbols that are used to organize network entities 310-314 so that the requesting entity or the network manager 102 can refer to the network entities 310-318 by name. For example, the namespace attributes 320-324 can include names assigned to the IP interface 310, the bridge interface 312, and VLAN interface 314.

The namespace attribute 320-324 are interdependent attributes because each namespace attribute is interdependent on other namespace attributes associated with network entities 318 in the OTF dependency graph 300. For example, the network manager 102 can structure the namespaces as hierarchies that include a base name and a unique name. The network manager 102 can assign the same domain name, as the base name, to the IP interface 310, the bridge interface 312, and the VLAN interface 314. The network manager 102 can also assign subdomain names, as unique names, to each of the IP interface 310, the bridge interface 312, and the VLAN interface 314. In one example, when the network manager 102 changes the domain name assigned to the bridge interface 312, the network manager 102 can change the domain names assigned to the IP interface 310 and VLAN interface 314 that are interdependent on the bridge interface 312.

The NMS can assign a speed attribute 326 and a duplex attribute 328 to the NIC 316. The speed attribute 326 can indicate a speed at which the NIC 316 may operate within the network system. The duplex attribute 328 can indicate whether there NIC 316 operates at a half-duplex mode or a full duplex mode. The speed attribute 326 and the duplex attribute 328 are independent attributes. When the NMS changes the speed attribute 326 or the duplex attribute 328 of the NIC 316, the attribute change does not affect the attributes of the other network entities 310-314.

FIG. 3B illustrates the OTF dependency graph 300 of FIG. 3A with network entities having MTU attributes according to one example. Some of the features in FIG. 3B are the same or similar to some of the features in FIG. 3A as noted by same reference numbers, unless expressly described otherwise. In one example, an STP attribute of the bridge interface 312 designates that the STP is on. In another example, a MTU attribute 332 of the bridge interface 312 designates that the MTU of the bridge interface 312 is 1500 bytes. In another example, a MTU attribute 334 of the VLAN interface 314 designates that the MTU of the VLAN interface 314 is 1500 bytes. In another example, a MTU attribute 334 of the NIC 318 designates that the MTU of the NIC 318 is 1500 bytes.

FIG. 3C illustrates adding a NIC bond 338 and a NIC 342 to the OTF dependency graph 300 to generate an OTF dependency graph 340 according to one example. Some of the features in FIG. 3C are the same or similar to some of the features in FIGS. 3A and 3B as noted by same reference numbers, unless expressly described otherwise. In one example, the requesting entity can send a request to network manager 102 (FIG. 1) to add the NIC bond 338 to the network system 100.

The NIC bond 338 combines multiple network entities into a single logical interface. For example, the NIC bond 338 can combine the NIC 342 and the NIC 316 into a single logical interface. The NIC bond 338 can increase data throughput in the NICs by balancing a workload between the NICs. The NIC bond 338 can provide redundancy by allowing failover between the NICS 342 and 316, where if one NIC fails the other NIC takes its place. To add the NIC bond 338 to the network system 100, the network manager 102 can use the predefined architectural template, as discussed above, to determine that the NIC bond 338 should be added below the layer where the VLAN interface 314 is located and above the layer where the NIC 316 is located.

When the network manager 102 has added the NIC bond 338 to the network system 100, the OTF dependency graph manager 110 can update the OTF dependency graph 340 to include the NIC bond 338. In one example, the OTF dependency graph manager 110 can update the OTF dependency graph 340 to include a first channel link between the VLAN interface 314 and the NIC bond 338. In another example, the OTF dependency graph manager 110 can update the OTF dependency graph 340 to include a second channel link between the NIC bond 338 and the NIC 318.

In another example, the OTF dependency graph manager 110 can update the OTF dependency graph 340 to include a first dependency link between the MTU attribute 334 and the MTU attribute 344. In another example, the OTF dependency graph manager 110 can update the OTF dependency graph 340 to include a second dependency link between the MTU attribute 344 and the MTU attribute 336.

In another example, the requesting entity can send a request to network manager 102 (FIG. 1) to add the NIC 342 to the network system 100. To add the NIC 342 to the network system 100, the network manager 102 can use the predefined architectural template, as discussed above, to determine that the NIC 340 should be added below the layer where the NIC bond 338 is located.

When the network manager 102 has added the NIC 340 to the network system 100, the OTF dependency graph manager 110 can update the OTF dependency graph 340 to include the NIC 340. In one example, the OTF dependency graph manager 110 can update the OTF dependency graph 340 to include a third channel link between the NIC bond 338 and the NIC 340. In another example, NIC 340 may not have any attributes that are interdependent on attributes of other network entities in the OTF dependency graph 340.

FIG. 3D illustrates changing an MTU attribute 352 of the bridge interface 312 in an OTF dependency graph 350 according to one example. Some of the features in FIG. 3D are the same or similar to some of the features in FIGS. 3A-3C as noted by same reference numbers, unless expressly described otherwise. In one example, the STP attributes of the network entities in network system 100 are independent of the other network entities and the other attributes in the network system 100. For example, the STP attribute of the bridge interface 312 can be changed from "ON" to "OFF" and the change does not affect any other attributes of the bridge interface 312 or the attributes of the VLAN interface 314 and the NIC 318.

In one example, the MTU attributes 352-358 of the network entities 318 can be dependent attributes, where each MTU attribute associated with one of the network entities 318 depends from the MTU attribute associated with one of the network entities 318 layered above it. For example, the MTU attribute 358 depends from the MTU attribute 356 because the NIC bond 338 is located at a layer directly above the NIC 316. The MTU attribute 356 depends from the MTU attribute 354 because the VLAN interface 314 is located at a layer directly above the NIC bond 338. The MTU attribute 354 depends from the MTU attribute 352 because the bridge interface 312 is located at a layer directly above the VLAN interface 314. The MTU attribute 352 does not depend from another MTU attribute because the IP interface does not have a MTU attribute associated with it. The bridge interface 312 is at the highest layer for network entities 318 with MTU attributes.

When a value of an MTU attribute for a selected network entity of the network entities 318 is changed in the OTF dependency graph 350, MTU attributes of the other network entities 318 that depend from it are changed in the OTF dependency graph 350 as well. In one example, when the network manager changes the MTU attribute 352 from 1500 bits (as shown in FIG. 3C) to 1000 bits (as shown in FIG. 3D), the network manager 102 (FIG. 1) can also change the MTU attributes 354-358. In another example, when the network manager changes the MTU attribute 356 from 1500 bits to 1000 bits, the network manager can also change the MTU attribute 358 because of the dependency of the MTU attribute 358 on the MTU attribute 356. The network manager 102 can use the OTF dependency graph 350 to determine the dependencies between the MTU attributes and change (e.g., exclusively) the requested MTU attribute and the MTU attributes that depend from it.

Figure 4A:
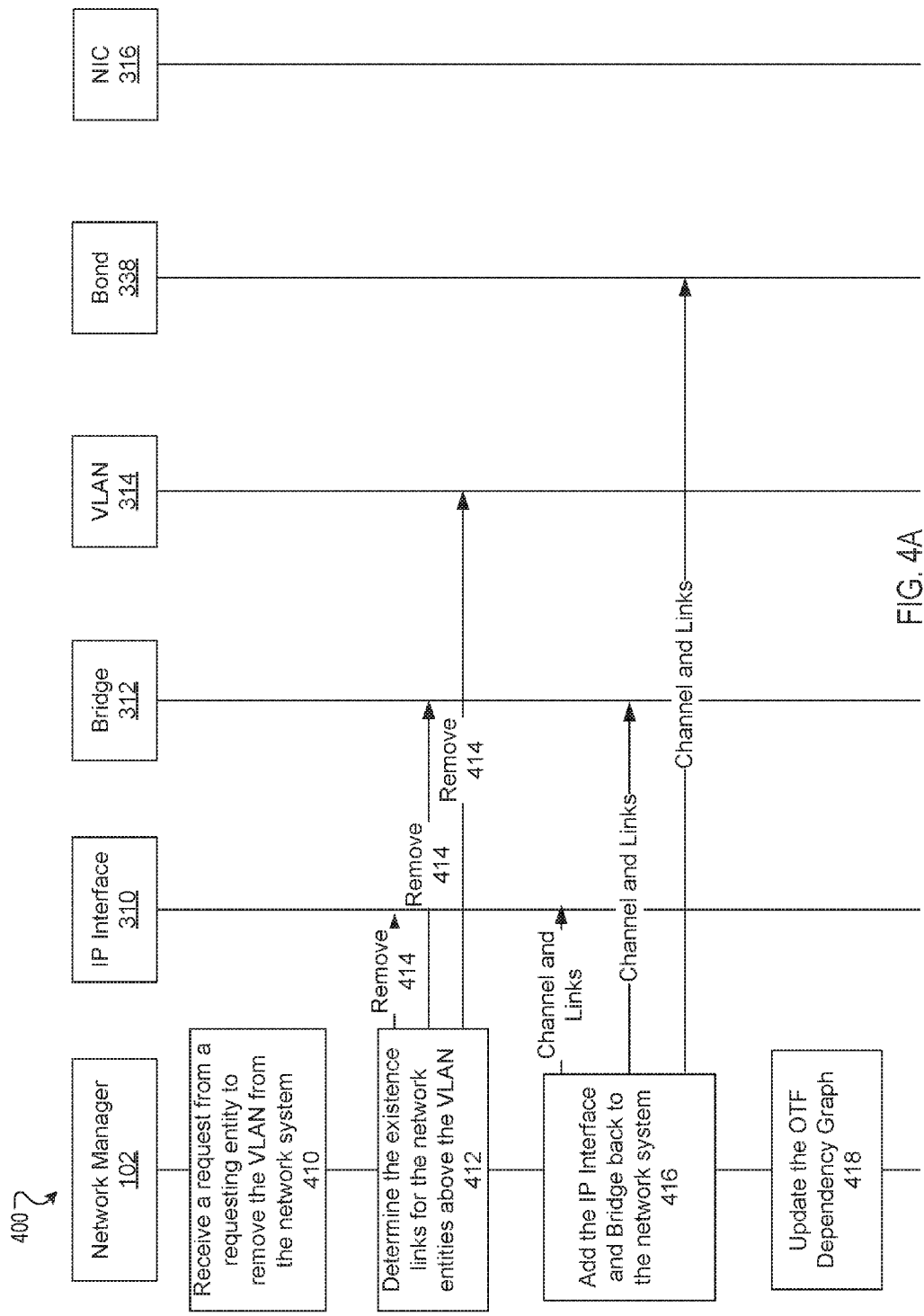
FIG. 4A illustrates a method for removing the VLAN interface from the network system using an OTF dependency graph according to one example.

FIG. 4A illustrates a method 400 for removing the VLAN interface 314 from the network system 100 using an OTF dependency graph according to one example. The method 400 may at least partially be performed by processing logic that includes hardware (e.g., circuitry, dedicated logic, programmable logic, microcode, etc.), computer program components (e.g., instructions executed by a processing device), or a combination thereof. The method 400 may be performed by all or part of the network system 100 of FIG. 1. For example, the method 400 may be performed by the network manager 102. Some of the features in FIG. 4A are the same or similar to the some of the features in FIGS. 1 and 3A-3D as noted by same reference numbers, unless expressly described otherwise.

Referring to FIG. 4A, the method 400 begins with the network manager 102 receiving a request from a requesting entity to remove the VLAN interface 314 from the network system 100 (410). The requesting entity can be an NMS or an agent or controller of the NMS. The method can include the network manager 102 determining channel links from the VLAN interface 314 to network entities in layers above the VLAN interface 314 (412). In one example, the network manager can use an OTF dependency graph to determine what needs to be changed in the network system and the dependencies that need to be changed to remove the VLAN interface 314. For example, referring to FIG. 3C, the network manager 102 can analyze the OTF dependency graph 300 by identifying the links between network entities and network entity attributes. The network manager 102 can analyze the OTF dependency graph 300 to determine that a first channel link is linking NIC bond 338 to VLAN interface 314, that a second channel link is linking VLAN interface 314 to the bridge interface 312, and that a third channel link is linking the bridge interface 312 to the IP interface 310.

As shown in the OTF dependency graphs 300, 340, and 350 of FIGS. 3B-3D, the network entities above the VLAN interface 314 can be the bridge interface 312 and the IP interface 310. In response to the request and the determination of the channel links, the network manager 102 can remove the VLAN interface 314, the bridge interface 312, and the IP interface 310 from the network system 100 (414). In one example, the network manager 102 removes the VLAN interface 314 and all of the network entities in layers above the VLAN interface 314 in the network system 100 because when the VLAN interface is removed, the data communication channels between the VLAN interface 314 and all of the network entities in layers above the VLAN interface 314 have to be reconfigured. In another example, the network manager 102 can edit what network entities are in the network system 100 and rebind the network entities in view of the relationships of the network entities as redefined by the request.

The method can include the network manager 102 adding the IP interface 310 and the bridge interface 312 back into the network system 100 (416).

In one example, to add the IP interface 310 and the bridge interface 312 back into the network system 100, the network manager 102 can establish data communication channels between the IP interface 310, the bridge interface 312, and the NIC bond 338. For example, the network manager 102 can establish a data communication channel from the NIC bond 338 to the bridge interface 312 and establish a data communication channel from the bridge interface 312 to the IP interface 310. In another example, to add the IP interface 310 and the bridge interface 312 back into the network system 100, the network manager 102 can generate, in the OTF dependency graph, channel links between the IP interface 310, the bridge interface 312, and the NIC bond 338. For example, the network manager 102 can link the NIC bond 338 to the bridge interface 312 and link the bridge interface 312 to the IP interface 310. In another example, to add the IP interface 310 and the bridge interface 312 back into the network system 100, the network manager 102 can generate, in the OTF dependency graph, the dependency links between the dependent attributes of the bridge interface 312 and the NIC bond 338. For example, the network manager 102 can link the MTU attribute 344 of the NIC bond 338 to the MTU attribute 332 of the bridge interface 312.

As the NIC 316 is already linked to the NIC bond 338 and was not removed from the network system 100, the channel links and the dependency links for the NIC 316 are already established in the network system 100. The method can include the network manager 102 updating an OTF dependency graph to include the channel links and the dependency links it established between the IP interface 310, the bridge interface 312, and the NIC bond 338 (418).

Figure 4B:
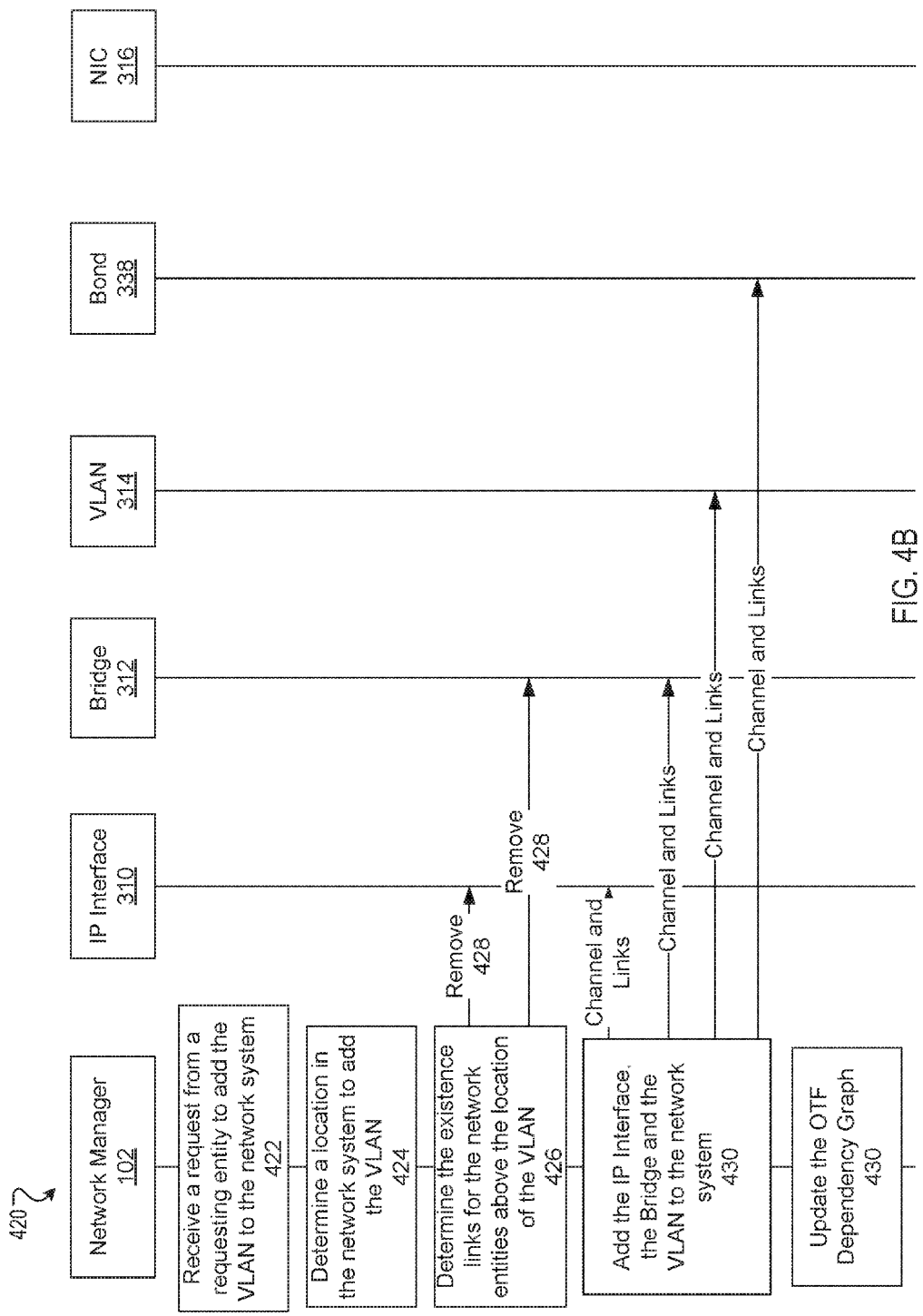
FIG. 4B illustrates a method for adding the VLAN interface to the network system using an OTF dependency graph according to one example.

FIG. 4B illustrates a method 420 for adding the VLAN interface 314 to the network system 100 using an OTF dependency graph according to one example. The method 420 may at least partially be performed by processing logic that includes hardware (e.g., circuitry, dedicated logic, programmable logic, microcode, etc.), computer program components (e.g., instructions executed by a processing device), or a combination thereof. The method 420 may be performed by all or part of the network system 100 of FIG. 1. For example, the method 420 may be performed by the network manager 102. Some of the features in FIG. 4B are the same or similar to the some of the features in FIGS. 1 and 3A-3D as noted by same reference numbers, unless expressly described otherwise.

Referring to FIG. 4B, the method 420 begins with the network manager 102 receiving a request from a requesting entity to add the VLAN interface 314 to the network system 100 (422). The method can include the network manager 102 determining a location in the network system 100 to add the VLAN interface 314 (424). In one example, the network manager 102 can analyze the OTF dependency graph to determine an architecture of the network system 100. The network manager 102 can then use a network system template to determine that the VLAN interface 314 should be added between the NIC bond 338 and the bridge interface 312.

The method can include the network manager 102 determining the existences links for the network entities above the location of the VLAN 314 (426). For example, the network manager 102 can analyze the OTF dependency graph to determine that the network system can have 5 layers. The 5 layers can include the IP interface 310 is located at a first layer, the bridge interface 312 is located at a second layer, the VLAN is to be added to a third layer, the NIC bond is located at the fourth layer and the NIC 316 is located at the fifth layer. The method can include the network manager 102 removing the bridge interface 312 and the IP interface 310 from the network system 100 (428).

The method can include the network manager 102 adding the IP interface 310, the bridge interface 312, and the VLAN interface 314 to the network system 100 using the OTF dependency graph (430).

In one example, to add the IP interface 310 and the bridge interface 312 back into the network system 100, the network manager 102 can establish data communication channels between the IP interface 310, the bridge interface 312, the VLAN interface 314, and the NIC bond 338. For example, the network manager 102 can establish a data communication channel from the NIC bond 338 to the VLAN interface 314, establish a data communication channel from the VLAN interface 314 to the bridge interface 312, and establish a data communication channel from the bridge interface 312 to the IP interface 310. In one example, to add the IP interface 310, the bridge interface 312, and the VLAN interface 314 to the network system 100, the network manager 102 can analyze the OTF dependency graph to determine to link the NIC bond 338 to the VLAN interface 314, the VLAN interface to the bridge interface, and the bridge interface 312 to the IP interface 310 using channel links.

In another example, to add the IP interface 310, the bridge interface 312, and the VLAN interface 314 to the network system 100 using the OTF dependency graph, the network manager 102 can establish the dependency links between the dependent attributes of the bridge interface 312, the VLAN interface 314, and the NIC bond 338. For example, the network manager 102 can link the MTU attribute 344 of the NIC bond 338 to the MTU attribute 354 of the VLAN interface 314 and it can link the MTU attribute 354 of the VLAN interface 314 to the MTU attribute 352 of the bridge interface 312.

As the NIC 316 is already linked to the NIC bond 338 and is not being added to the network system 100, the channel links or dependency links are already established. The method can include the network manager updating the OTF dependency graph to include the channel links and the dependency links it established between the IP interface 310, the bridge interface 312, the VLAN interface 314, and the NIC bond 338 (430).

Figure 4C:
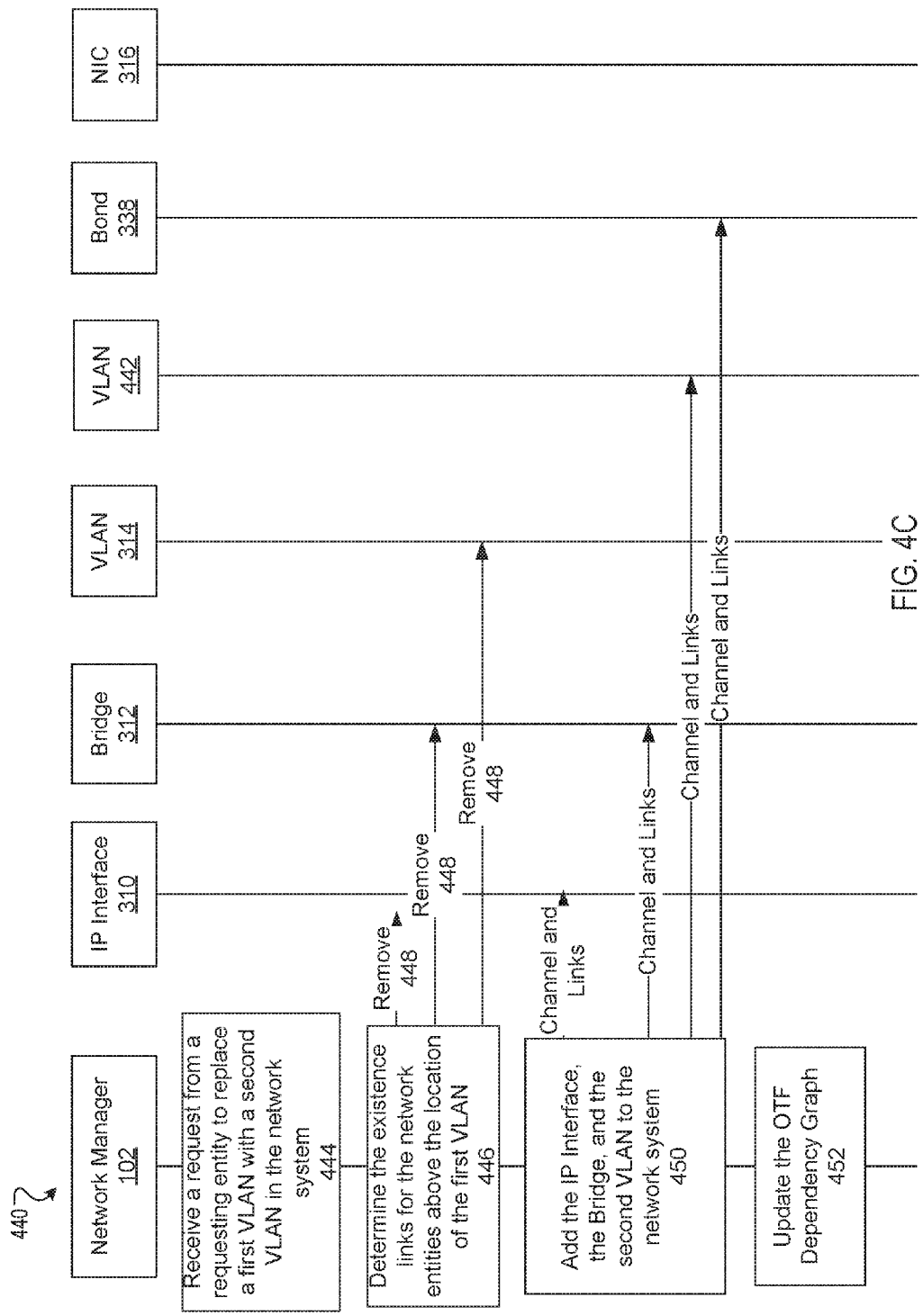
FIG. 4C illustrates a method for replacing a first VLAN interface with a second VLAN interface in the network system using an OTF dependency graph according to one example.

FIG. 4C illustrates a method 440 for replacing a first VLAN interface 314 with a second VLAN 442 in the network system 100 using an OTF dependency graph according to one example. The method 440 may at least partially be performed by processing logic that includes hardware (e.g., circuitry, dedicated logic, programmable logic, microcode, etc.), computer program components (e.g., instructions executed by a processing device), or a combination thereof. The method 440 may be performed by all or part of the network system 100 of FIG. 1. For example, the method 440 may be performed by the network manager 102. Some of the features in FIG. 4C are the same or similar to the some of the features in FIGS. 1 and 3A-3D as noted by same reference numbers, unless expressly described otherwise.

Referring to FIG. 4C, the method 440 begins with the network manager 102 receiving a request from a requesting entity to replace a first VLAN interface 314 with a second VLAN interface 442 in the network system 100 (444). The method can include the network manager 102 determining the channel links for the network entities above the location of the first VLAN interface 314 (446), as discussed above. For example, the network system 100 can have 5 layers where the IP interface 310 is located at a first layer, the bridge interface 312 is located at a second layer, the first VLAN interface is to be added to a third layer, the NIC bond is located at the fourth layer, and the NIC 316 is located at the fifth layer. The method can include the network manager 102 removing the first VLAN interface, the bridge interface 312, and the IP interface 310 from the network system 100 (448).

The method can include the network manager 102 adding the IP Interface 310, the bridge interface 312, and the second VLAN interface 442 to the network system (450).

In one example, to add the IP interface 310 and the bridge interface 312 back into the network system 100, the network manager 102 can establish data communication channels between the IP interface 310, the bridge interface 312, the second VLAN interface 442, and the NIC bond 338. For example, the network manager 102 can establish a data communication channel from the NIC bond 338 to the second VLAN interface 442, establish a data communication channel from the second VLAN interface 442 to the bridge interface 312, and establish a data communication channel from the bridge interface 312 to the IP interface 310. In one example, to add the IP interface 310, the bridge interface 312, and the VLAN interface 314 to the network system 100, the network manager 102 can establish channel links, in the OTF dependency graph, between the IP interface 310, the bridge interface 312, the VLAN interface 314, and the NIC bond 338 using the OTF dependency graph and the network system template as discussed above. For example, the network manager 102 can link the NIC bond 338 to the VLAN interface 314, the VLAN interface 314 to the bridge interface 312, and the bridge interface 312 to the IP interface 310.

In another example, to add the IP interface 310, the bridge interface 312, and the VLAN interface 314 to the network system 100, the network manager 102 can establish the dependency links between the dependent entity attributes of the bridge interface 312, the VLAN interface 314, and the NIC bond 338. For example, the network manager 102 can link the MTU attribute 344 of the NIC bond 338 to the MTU attribute 354 of the VLAN interface 314. In another example, the network manager 102 can link the MTU attribute 354 of the VLAN interface 314 to the MTU attribute 352 of the bridge interface 312.

As the NIC 316 is already linked to the NIC bond 338 and was not removed from the network system 100, the channel links and the dependency links for the NIC 316 are already established in the network system 100. The method can include the network manager 102 updating the OTF dependency graph to include the channel links and the dependency links it established between the IP interface 310, the bridge interface 312, the VLAN interface 314, and the NIC bond 338 (452).

Figure 4D:
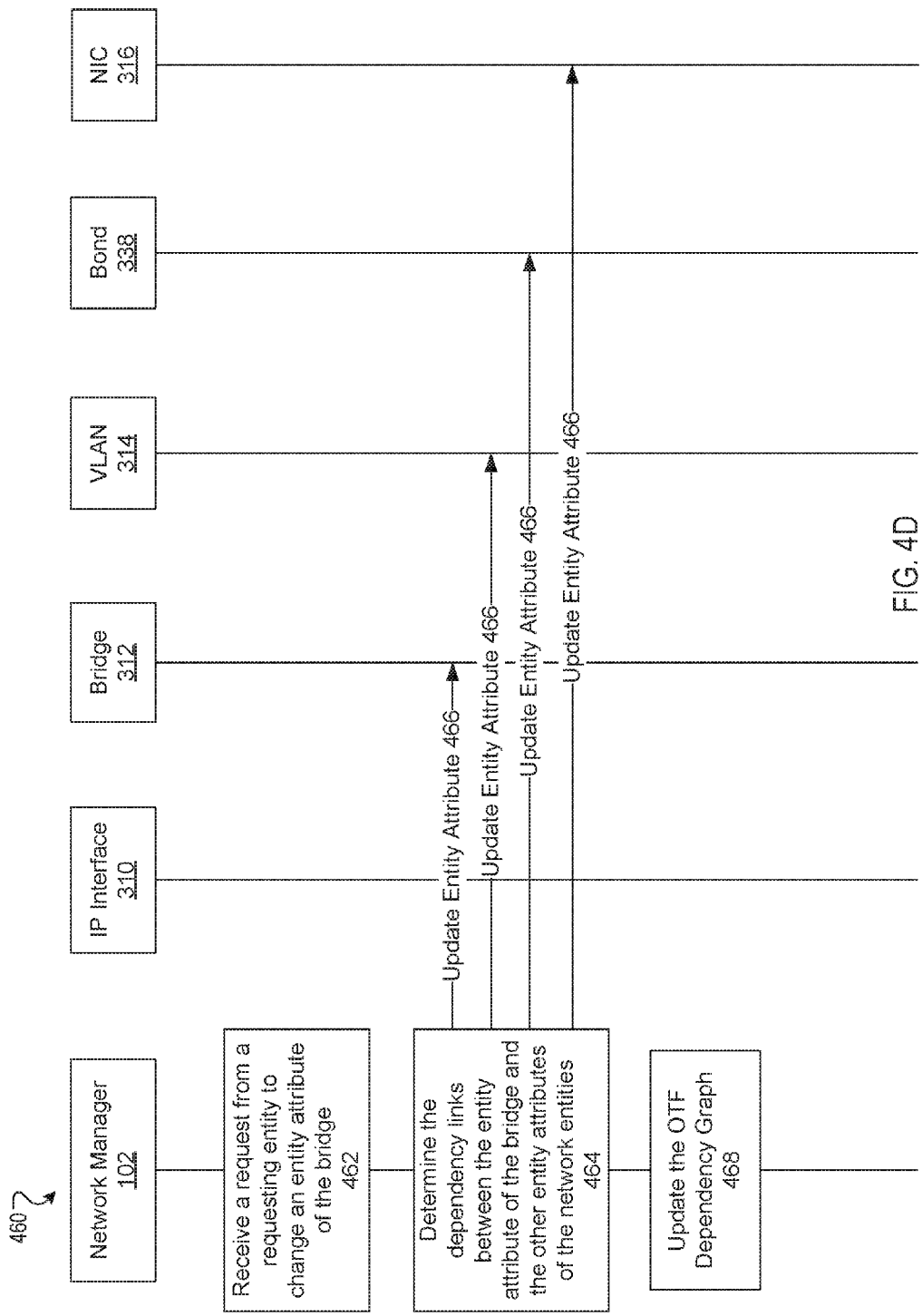
FIG. 4D illustrates a method for changing a network entity attribute of a bridge interface using an OTF dependency graph according to one example.

FIG. 4D illustrates a method 460 for changing a network entity attribute of the bridge interface 312 using an OTF dependency graph according to one example. The method 460 may at least partially be performed by processing logic that includes hardware (e.g., circuitry, dedicated logic, programmable logic, microcode, etc.), computer program components (e.g., instructions executed by a processing device), or a combination thereof. The method 460 may be performed by all or part of the network system 100 of FIG. 1. For example, the method 460 may be performed by the network manager 102. Some of the features in FIG. 4D are the same or similar to some of the features in FIGS. 1 and 3A-3D as noted by same reference numbers, unless expressly described otherwise.

Referring to FIG. 4D, the method 460 begins with the network manager 102 receiving a request from a requesting entity to change a dependent network entity attribute of the bridge interface 312 (462). In one example, the dependent network entity attribute can be a MTU attribute. In another example, the dependent network entity attribute can be a namespace attribute. The method can include the network manager 102 determining the dependency links between the network entity attribute of the bridge interface 312 and the other network entity attributes of the network entities in the network system 100 (464).

To change a dependent network entity attribute of the bridge interface 312, the network manager 102 can change the dependent network entity attributes of the other dependent attributes that are linked to the dependent network entity attribute of the bridge interface 312 (466). For example, when the network manager 102 changes the dependent network entity attribute of the bridge interface 312, the network manager 102 can also change the dependent attributes of the VLAN interface 314, the NIC bond 338, and the NIC 316. The method can include the network manager updating the OTF dependency graph to include the entity attributes it updated for the bridge interface 312, the VLAN interface 314, and the NIC bond 338 (468).

Figure 5:
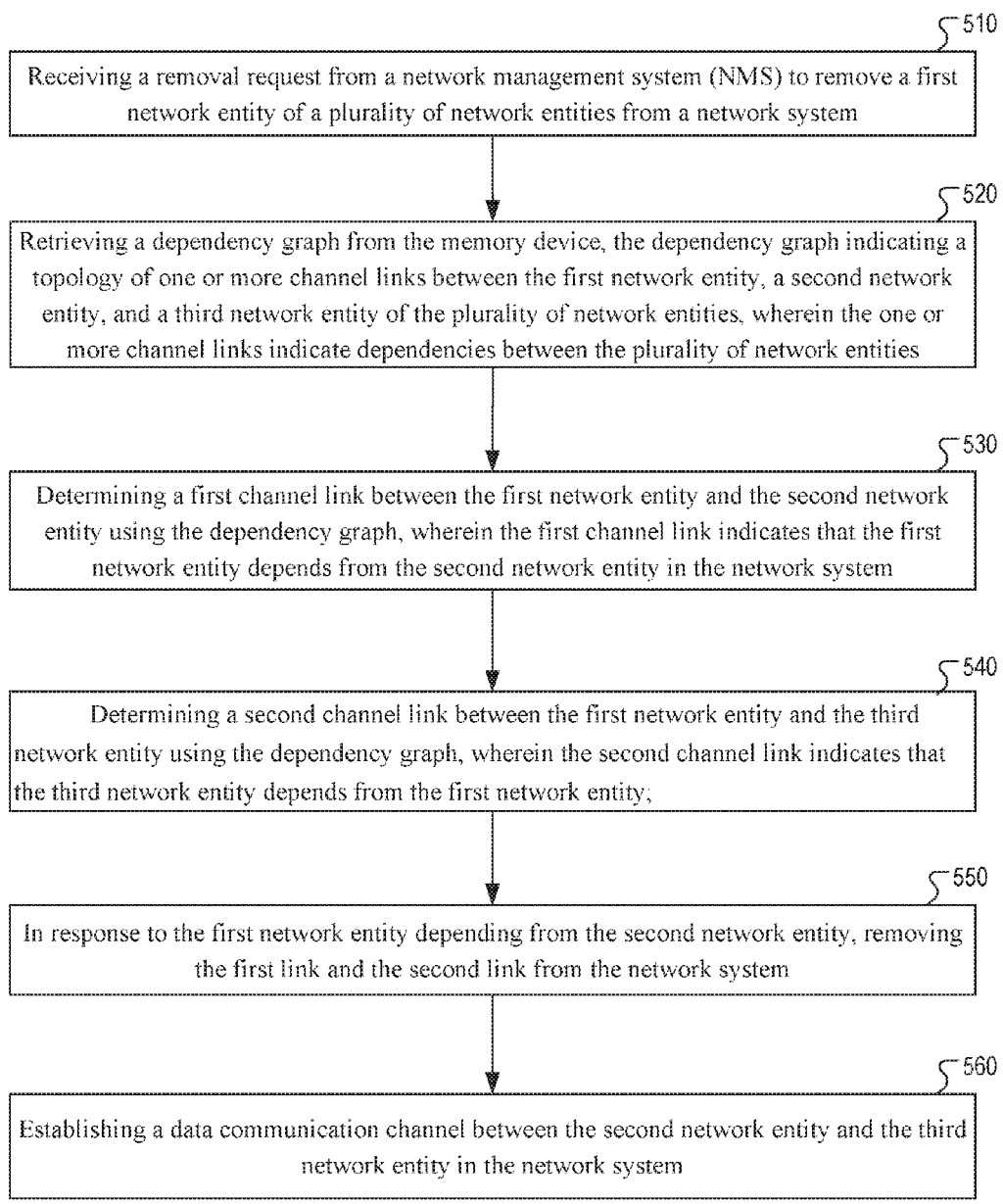
FIG. 5 depicts a flow diagram of one example of a method for removing a network entity from a network system according to one example.

FIG. 5 depicts a flow diagram of one example of a method 500 for removing a network entity from a network system according to one example. The method is performed by processing logic that may comprise hardware (circuitry, dedicated logic, etc.), computer programs (such as is run on a general purpose computer system or a dedicated machine), or a combination of both. The method 500 may be performed by all or part of the network system 100 of FIG. 1. For example, the method 500 may be performed by the network manager 102.

At block 510, a network manager can receive a removal request from a network management system (NMS) to remove a first network entity of a plurality of network entities from a network system. At block 520, the network manager can retrieve a dependency graph from the memory device. The dependency graph indicates a topology of one or more channel links between the first network entity, a second network entity, and a third network entity of the plurality of network entities, where the one or more channel links indicate dependencies between the plurality of network entities.

At block 530, the network manager can determine a first channel link between the first network entity and the second network entity using the dependency graph, where the first channel link indicates that the first network entity depends from the second network entity in the network system. At block 540, the network manager can determine a second channel link between the first network entity and the third network entity using the dependency graph, wherein the second channel link indicates that the third network entity depends from the first network entity. At block 550, in response to the first network entity depending from the second network entity, the network manager can remove the first link and the second link from the network system. At block 560, the network manager can establish a first data communication channel between the second network entity and the third network entity in the network system.

Figure 6:
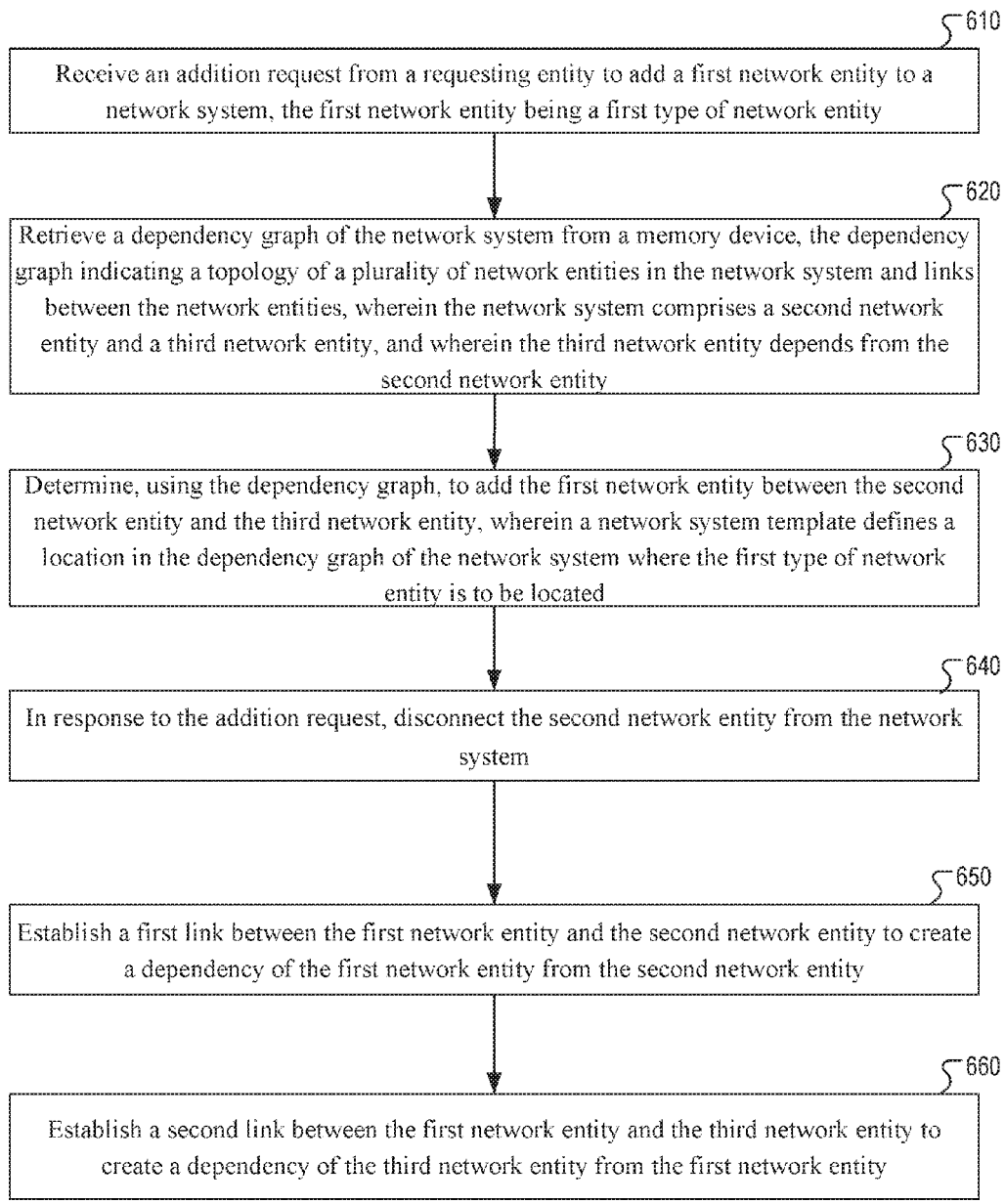
FIG. 6 depicts a flow diagram of one example of a method for adding a network entity to a network system according to one example.

FIG. 6 depicts a flow diagram of one example of a method 600 for adding a network entity to a network system according to one example. The method is performed by processing logic that may comprise hardware (circuitry, dedicated logic, etc.), computer programs (such as is run on a general purpose computer system or a dedicated machine), or a combination of both. The method 600 may be performed by all or part of the network system 100 of FIG. 1. For example, the method 600 may be performed by the network manager 102.

At block 610, a network manager can receive an addition request from a requesting entity to add a first network entity to a network system, the first network entity being a first type of network entity. At block 620, the network manager can retrieve a dependency graph of the network system from a memory device, where the dependency graph indicates a topology of a plurality of network entities in the network system and links between the network entities. The network system can include a second network entity and a third network entity, where the third network entity depends from the second network entity.

At block 630, the network manager can determine to add the first network entity between the second network entity and the third network entity, where a network system template defines a location in the dependency graph of the network system where the first type of network entity is to be located. At block 640, in response to the addition request, the network manager can disconnect the second network entity from the network system. At block 650, the network manager can establish a first link between the first network entity and the second network entity to create a dependency of the first network entity from the second network entity. At block 660, the network manager can establish a second link between the first network entity and the third network entity to create a dependency of the third network entity from the first network entity.

Figure 7:
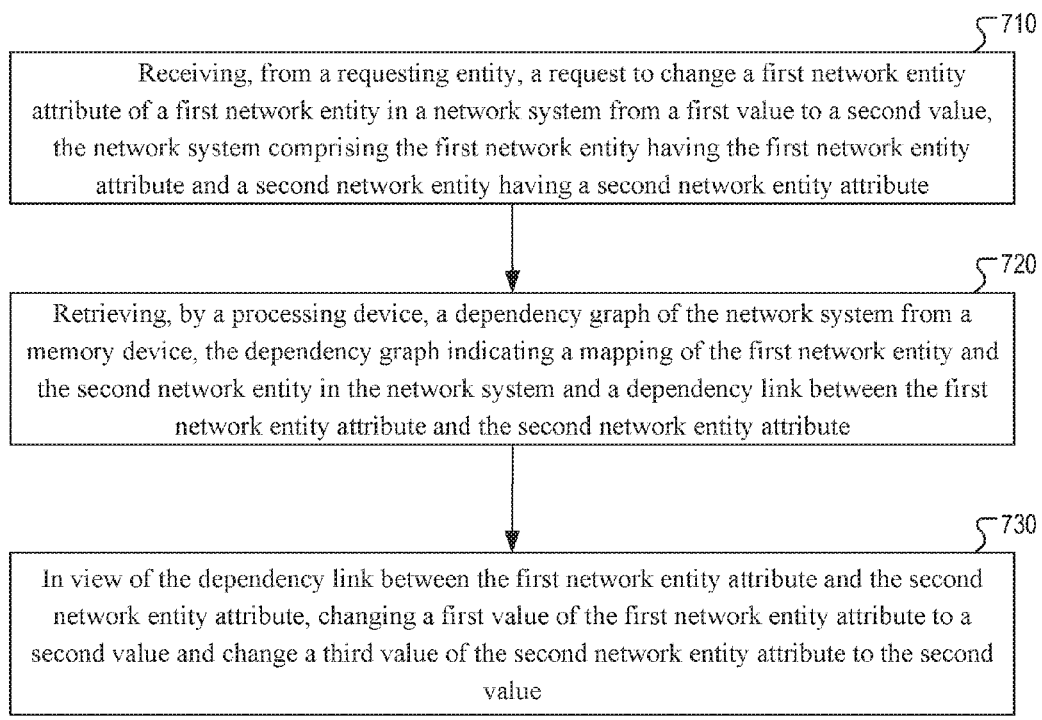
FIG. 7 depicts a flow diagram of one example of a method for changing a network entity in a network system according to one example.

FIG. 7 depicts a flow diagram of one example of a method 700 for changing a network entity in a network system according to one example. The method is performed by processing logic that may comprise hardware (circuitry, dedicated logic, etc.), computer programs (such as is run on a general purpose computer system or a dedicated machine), or a combination of both. The method 700 may be performed by all or part of the network system 100 of FIG. 1. For example, the method 700 may be performed by the network manager 102.

At block 710, a network manager can receive, from a requesting entity, a request to change a first network entity attribute of a first network entity in a network system from a first value to a second value. The network system can include the first network entity having the first network entity attribute and a second network entity having a second network entity attribute. At block 720, the network manager can retrieve a dependency graph of the network system from a memory device. The dependency graph can indicate a mapping of the first network entity and the second network entity in the network system and a dependency link between the first network entity attribute and the second network entity attribute. At block 730, in view of the dependency link between the first network entity attribute and the second network entity attribute, the network manager can change a first value of the first network entity attribute to a second value and change a third value of the second network entity attribute to the second value.

Figure 8:
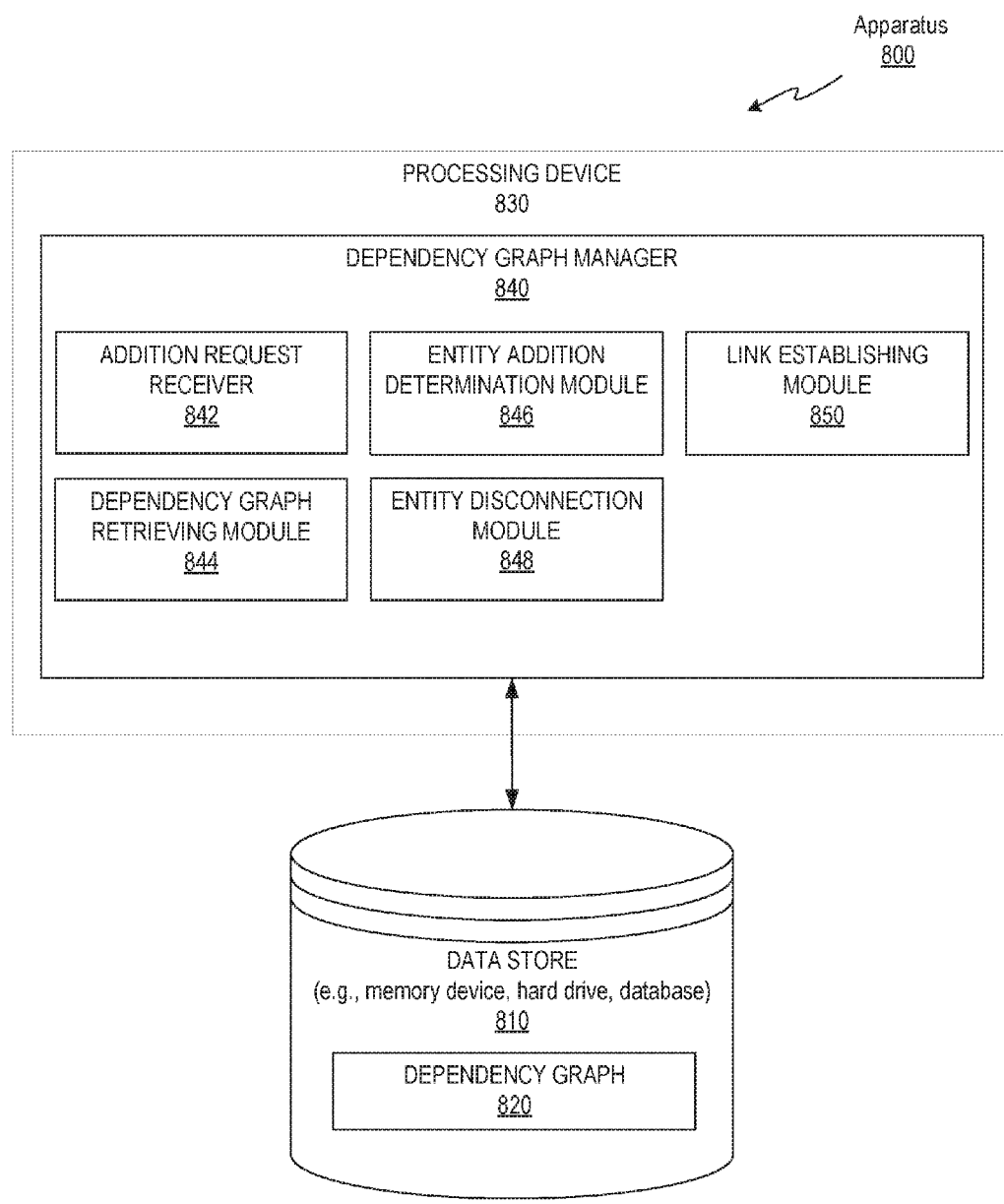
FIG. 8 illustrates an example apparatus in which implementations of the disclosure may operate.

FIG. 8 illustrates an example apparatus 800 in which implementations of the disclosure may operate. The apparatus 800 may be the same or similar to one of the network manager 102, the network entities 112 (FIG. 1), the network entities 214-218 (FIG. 2), the network entities 318 (FIG. 3A-3D), a storage device within network manager 102, or other computing device within the network system 100. Apparatus 800 may include components and modules for performing a recollection procedure to recapture storage space on the shared storage. The apparatus 800 may include a data store 810 that can store dependency graphs 820. The data store 810 may include any non-persistent data storage (e.g., memory), persistent data storage (e.g., flash storage, hard drive, tape), other medium, or combination thereof that is capable of storing instructions for carrying out the operations of the components and module discussed herein. The apparatus 800 may include components and modules for adding, removing, or modifying network entities in a network system. The apparatus 800 may include a processing device 830 with a dependency graph manager 840. The dependency graph manager 840 may include an addition request receiver 842, a dependency graph retrieving module 844, an entity addition determination module 846, an entity disconnection module 848, and a link establishing module 850.

The addition request receiver 842 can receive an addition request from a requesting entity to add a first network entity to a network system, the first network entity being a first type of network entity. The dependency graph retrieving module 844 can retrieve a dependency graph 820 of the network system from the data store 810, the dependency graph 820 indicating a topology of a plurality of network entities in the network system and links between the network entities. The network system can include a second network entity and a third network entity, and where the third network entity depends from the second network entity. The entity addition determination module 846 can determine, using the dependency graph 820, to add the first network entity between the second network entity and the third network entity. The network system template defines a location in the dependency graph 820 of the network system where the first type of network entity is to be located. The entity disconnection module 848 can, in response to the addition request, disconnect the second network entity from the network system. The link establishing module 850 can establish a first link between the first network entity and the second network entity to create a dependency of the first network entity from the second network entity. The link establishing module 850 can also establish a second link between the first network entity and the third network entity to create a dependency of the third network entity from the first network entity.

Figure 9:
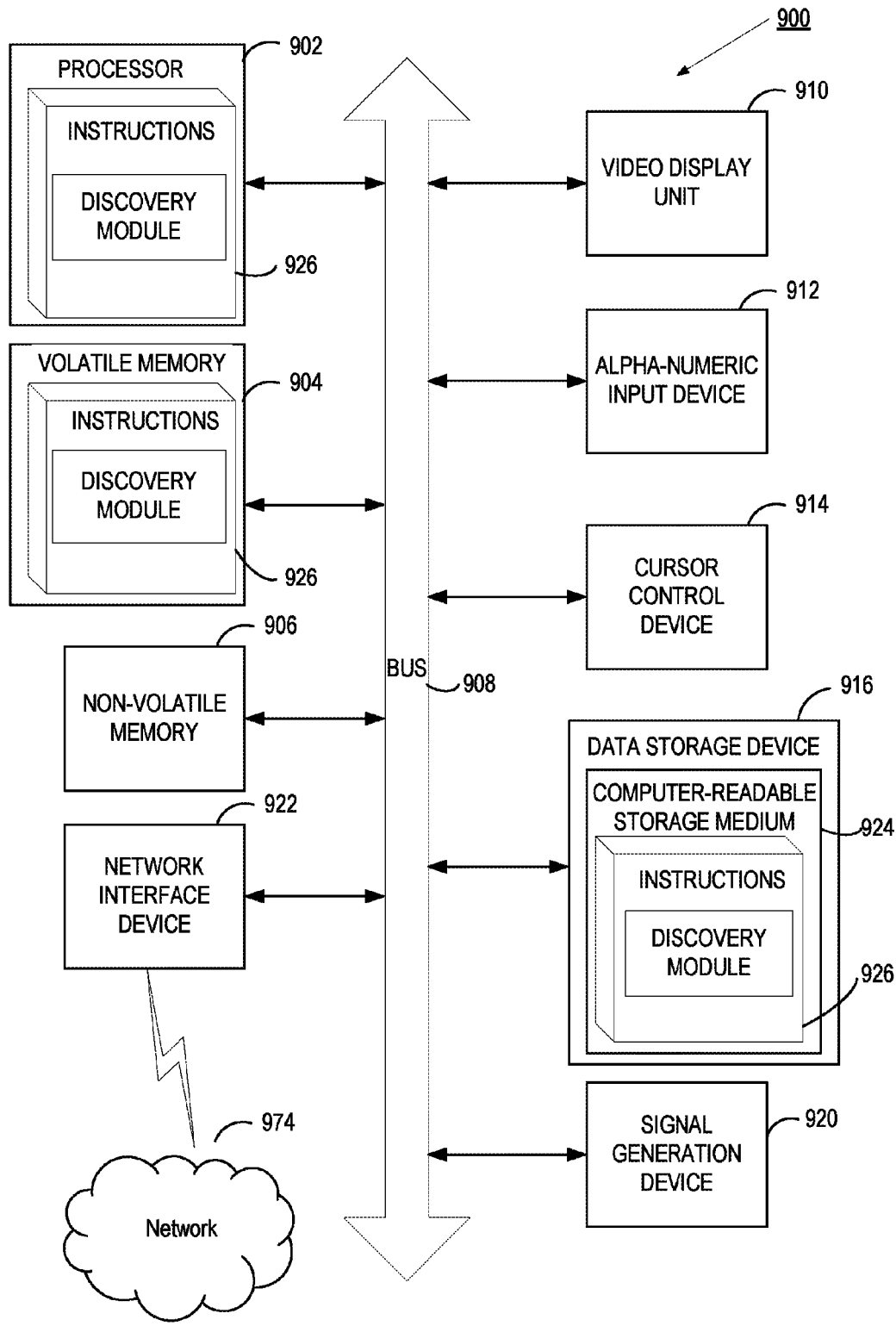
FIG. 9 depicts a block diagram of a computer system operating in accordance with one or more aspects of the present disclosure.

FIG. 9 depicts a block diagram of a computer system operating in accordance with one or more aspects of the present disclosure. In various illustrative examples, computer system 900 may correspond to one or more of the network manager 102, the network entities 112, the devices 114, or the network interfaces 116 of FIG. 1.

In certain implementations, computer system 900 may be connected (e.g., via a network, such as a Local Area Network (LAN), an intranet, an extranet, or the Internet) to other computer systems. Computer system 900 may operate in the capacity of a server or a client computer in a client-server environment, or as a peer computer in a peer-to-peer or distributed network environment. Computer system 900 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 900 may include a processor 902, a volatile memory 904 (e.g., random access memory (RAM)), a non-volatile memory 906 (e.g., read-only memory (ROM) or electrically-erasable programmable ROM (EEPROM)), and a data storage device 916, which may communicate with each other via a bus 908.

Processor 902 may be provided by one or more processing devices such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 900 may further include a network interface device 922. Computer system 900 also may include a video display unit 910 (e.g., an LCD), an alpha-numeric input device 912 (e.g., a keyboard), a cursor control device 914 (e.g., a mouse), and a signal generation device 920.

Data storage device 916 may include a non-transitory computer-readable storage medium 924 on which may store instructions 926 encoding any one or more of the methods or functions described herein, including instructions for implementing methods 400, 420, 440, 500, 600, and 700.

Instructions 926 may also reside, completely or partially, within volatile memory 904 and/or within processor 902 during execution thereof by computer system 900, hence, volatile memory 904 and processor 902 may also constitute machine-readable storage media.

While computer-readable storage medium 924 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by computer program modules or functional circuitry within hardware devices. Further, the methods, components, and features may be implemented in any combination of hardware devices and computer program components, or only in computer programs.

Unless specifically stated otherwise, terms such as "loading," "transmitting," "receiving," "overwriting," "initiating," "discovering," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400, 420, 440, 500, 600, and 700 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving, by a processing device, a removal request from a network management system (NMS) to remove a first network entity of a plurality of network entities from a network system;
   retrieving, by the processing device, a dependency graph from a memory device, the dependency graph indicating a topology of one or more channel links between the first network entity, a second network entity, and a third network entity of the plurality of network entities, wherein the one or more channel links indicate dependencies between the plurality of network entities;
   determining, by the processing device, a first channel link between the first network entity and the second network entity using the dependency graph, wherein the first channel link indicates that the first network entity depends from the second network entity in the network system;
   determining, by the processing device, a second channel link between the first network entity and the third network entity using the dependency graph, wherein the second channel link indicates that the third network entity depends from the first network entity;
   in response to the first network entity depending from the second network entity, removing, by the processing device, the first link and the second link from the network system; and
   establishing, by the processing device, a first data communication channel between the second network entity and the third network entity in the network system.

2. The method of claim 1, further comprising updating, by the processing device, the dependency graph with a third channel link between the second network entity and the third network entity to show that the third network entity depends from the second network entity.

3. The method of claim 1, wherein the dependency graph is an on-the-fly (OTF) dependency graph that is updated by the processing device while the first network entity and the second network entity are being used in the network system.

4. The method of claim 1, further comprising establishing, by the processing device, an attribute link in the dependency graph between a first entity attribute of the second network entity and a second entity attribute of the third network entity.

5. The method of claim 1, further comprising:
   determining, by the processing device, a fourth link between the second network entity and a fourth network entity using the dependency graph, wherein the fourth link indicates that the second network entity depends from the fourth network entity;
   in response to the second network entity depending from the fourth network entity, removing the first network entity, the second network entity, the third network entity, and fourth network entity from the network system; and
   establishing a second data communication channel between the fourth network entity and the second network entity, wherein the dependency graph indicates data communication channel between the first network entity, the second network entity, the third network entity, and the fourth network entity.

6. The method of claim 5, wherein the first network entity is a virtual local area network (VLAN) interface, the second network entity is a bridge interface, the third network entity is a network interface card (NIC) bond, and the fourth network entity is an internet protocol (IP) interface.

7. The method of claim 1, further comprising:
   receiving, by the processing device, a setup request from the NMS to setup the network system with the plurality of network entities, wherein the request comprises one or more parameters for the network system;
   determining, by the processing device, a network architecture for one or more network entities that meets the parameters in the setup request, wherein each of the one or more network entities has a network entity attribute associated with it;
   establishing, by the processing device, channel links between the one or more network entities for the network architecture, wherein the channel links define dependencies between the one or more network entities;
   establishing, by the processing device, attribute links between the network entities attributes of the one or more network entities, wherein the attribute links define dependencies between the network entities attributes of the one or more network entities;
   generating, by the processing device, the dependency graph using architectural information of the network architecture for the network system; and
   store the dependency graph in a database.

8. The method of claim 1, further comprising establishing, by the processing device, a fifth link between a first network entity attribute of the second network entity and a second network entity attribute of the third network entity, wherein the second network entity attribute depends from the first network entity attribute.

9. The method of claim 8, wherein:
   the first network entity attribute is a first maximum transmission unit (MTU) attribute or a first namespace attribute, and the second network entity attribute is a second MTU attribute or a second namespace attribute.

10. An apparatus comprising:
a memory device;
a processing device operatively coupled to the memory device, wherein the processing device is to:
receive an addition request from a requesting entity to add a first network entity to a network system, the first network entity being a first type of network entity;
retrieve a dependency graph of the network system from a memory device, the dependency graph indicating a topology of a plurality of network entities in the network system and links between the network entities, wherein the network system comprises a second network entity and a third network entity, and wherein the third network entity depends from the second network entity;
determine, using the dependency graph, to add the first network entity between the second network entity and the third network entity, wherein a network system template defines a location in the dependency graph of the network system where the first type of network entity is to be located;
in response to the addition request, disconnect the second network entity from the network system;
establish a first link between the first network entity and the second network entity to create a dependency of the first network entity from the second network entity; and
establish a second link between the first network entity and the third network entity to create a dependency of the third network entity from the first network entity.

11. The apparatus of claim 10, wherein the processing device is further to update the dependency graph to include the first network entity, the second network entity, the first link, and the second link.

12. The apparatus of claim 10, wherein the processing device is further to update the dependency graph on-the-fly (OTF) while the first network entity and the second network entity are being used in the network system.

13. The apparatus of claim 10, wherein the network system template designates a layering of network entities in an architecture of the network system.

14. The apparatus of claim 13, wherein the plurality of network entities in the network system comprises one or more of an internet protocol (IP) interface, a bridge interface, a virtual local area network (VLAN) interface, a network interface card (NIC) bond, or a NIC.

15. The apparatus of claim 14, wherein the network system template defines that:
the IP interface is at a first level of the architecture of the network system;
the bridge interface is at a second level of the architecture of the network system;
the VLAN interface is at a third level of the architecture of the network system;
the NIC bond is at a fourth level of the architecture of the network system;
the NIC bond is at a fifth level of the architecture of the network system; and
the NIC is at a sixth level of the architecture of the network system.

16. The apparatus of claim 14, wherein:
a first maximum transmission unit (MTU) attribute is associated with the bridge interface;
a second MTU attribute is associated with the VLAN interface;
a third MTU attribute is associated with the network interface card (NIC) bond; and
a fourth MTU attribute is associated with the NIC.

17. The apparatus of claim 16, wherein:
the network system template defines that the fourth MTU attribute of the NIC is dependent on the third MTU attribute of the NIC bond;
the third MTU attribute of the NIC bond is dependent on the second MTU attribute of the VLAN interface; and
the second MTU attribute of the VLAN is dependent on the first MTU attribute of the bridge interface.

18. The apparatus of claim 10, wherein the requesting entity is a network management system (NMS) or a controller coupled to the NMS.

19. A non-transitory computer readable storage medium, having instructions stored therein, which when executed, cause a processing device to:
receive, from a requesting entity, a request to change a first value of a first network entity attribute of a first network entity in a network system to a second value, the network system comprising the first network entity having the first network entity attribute and a second network entity having a second network entity attribute;
retrieve, by a processing device, a dependency graph of the network system from a memory device, the dependency graph indicating a mapping of the first network entity and the second network entity in the network system and a dependency link between the first network entity attribute and the second network entity attribute; and
in view of the dependency link between the first network entity attribute and the second network entity attribute, change the first value of the first network entity attribute to the second value and change a first value of the second network entity attribute to the second value of the first network entity attribute while the first network entity and the second network entity are used in the network system.

20. The non-transitory computer readable storage medium of claim 19, wherein:
the first network entity attribute is a first maximum transmission unit (MTU) attribute and the second network entity attribute is a second MTU attribute; or
the first network entity attribute is a first namespace attribute and the second network entity attribute is a second namespace attribute.

21. The non-transitory computer readable storage medium of claim 19, wherein the second network entity attribute depends from the first network entity attribute.

22. The non-transitory computer readable storage medium of claim 19, wherein:
a network system template defines a predefined dependency of the first network entity attribute and the second network entity attribute; and
the network system template defines a predefined layering the first network entity and the second network entity in an architecture of the network system.

* * * * *